(12) United States Patent
Foth et al.

(10) Patent No.: US 8,190,525 B2
(45) Date of Patent: May 29, 2012

(54) SYSTEM AND METHOD FOR PAYMENT FOR BUSINESS REPLY MAIL

(75) Inventors: Thomas J. Foth, Trumbull, CT (US); John G. Desmond, Fairfield, CT (US); Amy E. Harris, Westport, CT (US); Jill Q. Chen, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 13/314,341

(22) Filed: Dec. 8, 2011

(65) Prior Publication Data

US 2012/0078796 A1    Mar. 29, 2012

Related U.S. Application Data

(63) Continuation of application No. 10/745,422, filed on Dec. 22, 2003, now abandoned.

(51) Int. Cl.
*G06Q 40/00* (2006.01)
(52) U.S. Cl. ......................................................... 705/40
(58) Field of Classification Search ...................... 705/40
See application file for complete search history.

(56) References Cited

U.S. PATENT DOCUMENTS

| | | | |
|---|---|---|---|
| 5,019,991 A | 5/1991 | Sansone et al. | |
| 5,051,914 A | 9/1991 | Sansone et al. | |
| 5,239,168 A | 8/1993 | Durst, Jr. et al. | |
| 5,283,829 A | 2/1994 | Anderson | |
| 5,475,603 A | 12/1995 | Korowotny | |
| 5,717,596 A | 2/1998 | Bernard et al. | |
| 5,826,247 A * | 10/1998 | Pintsov et al. | 705/404 |
| 5,920,847 A | 7/1999 | Kolling et al. | |
| 6,052,675 A | 4/2000 | Checchio | |
| 6,311,170 B1 | 10/2001 | Embrey | |
| 6,405,182 B1 | 6/2002 | Cuervo | |
| 2003/0080183 A1 | 5/2003 | Rajasekaran | |
| 2003/0163421 A1* | 8/2003 | Van Ness et al. | 705/40 |
| 2004/0158522 A1 | 8/2004 | Brown et al. | |

FOREIGN PATENT DOCUMENTS

FR    2665003    1/1992

OTHER PUBLICATIONS

PR Newswire: "Beat the Postal Increase With Postagepro (™)", Nov. 30, 1994, retrieved from Dialog, Dialog No. 0766641.

* cited by examiner

*Primary Examiner* — Charles Kyle
*Assistant Examiner* — Clifford Madamba
(74) *Attorney, Agent, or Firm* — Brian A. Lemm; Charles R. Malandra, Jr.; Steven J. Shapiro

(57) ABSTRACT

A business reply mail payment system and method is provided. A business reply mail payment system establishes a master account with the postal system for the payment of business reply mail. A plurality of mailers each establish a separate account with the payment system and transfer control of payment for business reply mail accepted under their respective permit imprints to the payment system. When the mailer will be receiving business reply mail, a request for payment of postage is made to the payment system, which processes the information related to the business reply mail. The post office acceptance site communicates with the payment system as the business reply mail is received and compares the received business reply mail with the information processed by the payment system to determine if it should be accepted or rejected. If the business reply mail is accepted, the master account is debited for payment.

19 Claims, 4 Drawing Sheets

SYSTEM AND METHOD FOR PAYMENT FOR BUSINESS REPLY MAIL

CROSS REFERENCE TO RELATED APPLICATIONS

This application is a continuation application of application Ser. No. 10/745,422, filed Dec. 22, 2003, the specification of which is hereby incorporated by reference.

FIELD OF THE INVENTION

The invention disclosed herein relates generally to the field of mail payment systems, and more particularly to a system and method for payment of business reply mail.

BACKGROUND OF THE INVENTION

Many companies and private concerns use business reply mail (BRM) to solicit information and responses from their customers or potential customers. As such, business reply mail has a wide variety of uses and is often customized depending upon the needs of the sender. A few examples of the uses for business reply mail are subscription solicitations, information request responses, proxy statement responses, remittance documents (invoices for payment due) and the like. Oftentimes, the business reply mail is provided to customers or potential customers as part of a direct mail campaign, an invoice or as a detachable insert in a periodical magazine or newsletter.

Business reply mail requires the sender, e.g., company, private concern, or the like, to pay for the postage of the BRM. As such, BRM is required to include an endorsement that states "No Postage Necessary If Mailed In The United States" in the upper right hand corner, along with a business reply legend, a permit number and a postage payment endorsement that states "Postage Will Be Paid by Addressee." The delivery address printed on the BRM includes the name of the BRM permit holder. Thus, based on the permit number and name of the permit holder, the post office can determine the entity that is responsible for paying for the postage of the BRM. With BRM, however, the sender only has to pay for postage on the mail pieces that are actually returned by its customers. The sender can receive the returned BRM in one of two ways. The carrier could collect all of the returned BRM for a certain period of time and then deliver the returned BRM to the sender. Alternatively, the carrier could simply hold all of the returned BRM and the sender could retrieve it from the local post office as desired. Either way, the sender must pay for each of the BRM mail pieces that are returned.

There are currently several methods for the sender, also referred to as mailer, to pay the postal service for business reply mail. Such payment can be, for example, in the form of a check, cash, uncancelled stamps, or debit from a local non-interest bearing trust account into which money must be deposited. The United States Postal Service (USPS) also provides certain mailers with a postage payment system referred to as the Centralized Account Processing System (CAPS), which provides electronic options to presenting checks or cash in person. CAPS utilizes either a centralized non-interest bearing trust account, in which funds are deposited electronically, via standard Automated Clearing House (ACH) banking mechanisms, or a centralized debit account, in which the sender's designated bank account will be debited, via standard ACH banking mechanisms.

There are problems, however, with the conventional systems for paying for business reply mail. For example, if the mailer is paying by cash, check, or uncancelled stamps, payment must be presented at the time the BRM is delivered by the carrier or picked up from the local post office. Accordingly, the mailer must have either the correct amount of cash or uncancelled stamps, or be able to quickly draft a check for the correct amount. There is also an issue with the security of the cash, uncancelled stamps, or check if the party picking up the BRM at the USPS cannot be completely trusted (perhaps because the party picking up the returned BRM and delivering it to the sender is simply a third party courier).

In addition to the above problems, payment in the form of cash or a check adds processing costs for the postal authority. For example, it takes additional time and expenses to record and account for payments made in this manner. Since funds are collected in a distributed fashion, it is possible for funds to get misplaced and/or checks to get lost.

To overcome the above problems, the USPS utilizes CAPS as previously described. While CAPS may have alleviated some of the problems, several still remain. For example, there are several thresholds that a mailer must meet to qualify for CAPS, such as, for example, a minimum amount of postage each year. For example, to qualify for CAPS, a mailer currently must have a permit account with a minimum of $500,000 of postage each year. Alternatively, a mailer can have three permits in two or more postal locations with a minimum of $10,000 of postage per year, or three or more permits at one post office with a minimum of $50,000 postage per year. Many businesses currently do not meet any of these requirements, and therefore do not qualify for CAPS. Even if the thresholds were removed so all mailers would qualify for CAPS, several problems would still remain. For example, if large numbers of mailers utilized CAPS, there would be additional expenses for the postal authority to maintain and service the large number of CAPS accounts.

Additionally, from the mailer's perspective, CAPS also has limitations. For example, with the centralized trust account, the funds for payment of the postage must be deposited prior to receiving the returned BRM, thereby tying up funds in a non-interest bearing account. With the centralized debit account, some mailers are reluctant to provide their banking information to the USPS and other suppliers. With the use of either the centralized trust account or the centralized debit account, additional record keeping is necessary to reconcile the amount debited or charged by the postal authority. Furthermore, the USPS is not permitted to grant credit to a mailer or pay interest on deposits, thereby making it necessary for the mailer to ensure that correct amounts are available in their account or risk delays in receiving their returned BRM. Such delays could cost the mailer significant amounts in both money and customers.

Thus, there exists a need for a trusted system and method that allows mailers of all sizes to pay for business reply mail without presenting cash, uncancelled stamps, or a check at the time of receiving the returned BRM. Additionally, there is a need for a system and method that provides mailers with payment options, such as, for example, a credit line or an interest bearing account, to pay for business reply mail, reduces the amount of record keeping for both mailers and the postal authority, and provides mailers with additional resources to manage their funds more effectively.

SUMMARY OF THE INVENTION

The present invention alleviates the problems associated with the prior art and provides a trusted system and method that allows mailers of all sizes to pay for business reply mail, reduces the amount of record keeping for both mailers and the postal authority, provides mailers with additional resources to manage their funds more effectively, and reduces USPS operating costs, including, for example, check processing costs.

In accordance with the present invention, a BRM payment system establishes a payment account with the postal system for payment for BRM. The account may be, for example, a CAPS account in the U.S., or simply a standard type of payment account. A plurality of mailers each establish a separate account with the BRM payment system and transfer control of payment for returned BRM under their respective permit imprints to the BRM payment system. The account could be set up, for example, as an interest bearing or non-interest bearing deposit account for each mailer from which funds may be used to pay the postage for the BRM returned to each mailer. Additionally, the BRM payment system could establish a credit line for each mailer.

When a mailer decides to send a mailing that includes BRM for return to the mailer, the mailer notifies the BRM payment system and authorizes the BRM payment system to provide payment to the post office, from the BRM payment service's payment account, for the returned BRM. Preferably, the mailer provides information related to the BRM. Such information could include, for example, the permit imprint number for the BRM, the zip code number associated with the permit number, i.e., the zip code of the addressee to which the BRM will be returned, the return address that should appear on every piece of BRM (including the permit holder's name), a maximum number of pieces expected under the current authorization (which when exceeded causes the current authorization to automatically expire), a maximum postage amount under the current authorization (which when exceed causes the current authorization to automatically expire), a daily limit amount for the number of pieces or postage amount, threshold amounts for either the number pieces received or amount of postage paid upon which the mailer will be notified, and a fixed date upon which the current authorization should automatically expire. The BRM payment system processes the information related to the BRM and, provided funds are available within the mailer's account or the expected amount is within the mailer's credit limit, agrees to make payments to the postal service for the returned BRM. Preferably, the BRM payment service issues a payment authorization number (PAN) to the mailer for each authorization, thereby allowing the mailer to track different authorizations separately.

As the postal facility receives the returned BRM, an amount of postage due for the BRM is calculated, such as, for example, by completing USPS Form 3582-C Postage Due Invoice. The postal facility then communicates with the BRM payment system to confirm that payment is authorized for the returned BRM, i.e., that an active PAN exists for the returned BRM, based, for example, on the permit number and permit holder's name (which must appear on the BRM). The BRM payment system will preferably again determine that sufficient funds are available within the mailer's account or within the mailer's credit limit to pay the postage due for the returned BRM as calculated by the postal facility. If insufficient funds or credit are available, the BRM payment system will indicate to the postal facility that the returned BRM should be rejected, i.e., not returned to the mailer, as payment will not be made. If sufficient funds or credit are available within the mailer's account, the BRM payment system will acknowledge that an authorization exists and provide the conditions for acceptance of the returned BRM, based on the information associated with the BRM previously provided by the mailer, to the postal facility.

The postal facility then determines if the conditions for acceptance are satisfied, including, for example, if the maximum total number of pieces or maximum daily number of pieces have been exceeded, and if the maximum total postage amount or maximum daily postage amount have been exceeded. If the conditions for acceptance of the returned BRM have been satisfied, the postal facility will indicate such to the BRM payment system and accept the returned BRM for delivery back to the mailer. Upon receiving notification of acceptance of the returned BRM, the BRM payment system will charge the mailer's account and perform accounting procedures to update the information associated with BRM, such as, for example, incrementing the total number of pieces returned and amount of postage paid to reflect the returned BRM just accepted. Preferably, the BRM payment system provides notification to the mailer that the returned BRM has been accepted, and can include the details from the 3582-C Postage Due Invoice form. The notification can also provide the mailer with the current status of the PAN, thereby allowing the mailer to determine if the PAN should be renewed based on threshold information or the date of expiration. If the returned BRM was rejected, the BRM payment system can also provide a notification to the mailer of the rejection and the reason for the rejection.

The BRM payment system provides payment to the postal service for the returned BRM that has been accepted for return to the mailer. This can be performed, for example, on a daily basis by totaling the funds due the postal service from all of the 3582-C Postage Due Invoice forms submitted to the system that day. Thus, the BRM payment system can aggregate the amount due for a number of different mailers and provide a single payment to the postal service.

The BRM payment system also settles all transactions with the mailers. The particular type of settlement depends upon the type of account the mailer has with the BRM payment system. For example, the BRM payment system could invoice the mailer for all returned BRM accepted within a given time period, such as, for example one or two weeks. If the mailer has funds on account with the BRM payment system, the BRM payment system could deduct the funds from the mailer's account on a predetermined regular basis, such as, for example, daily, weekly, etc. Alternatively, the funds could be deducted as soon as each transaction is completed. The present invention provides mailers with multiple payment options for business reply mail including "Just-In-Time" payments, "Pay In Advance" payments, and/or "Pay In Arrears" payments. The "Just-In-Time" payment option allows the mailer to pay the BRM payment system when the returned BRM is accepted by the post office. The "Pay In Arrears" payment option provides the mailer with a credit line to pay for BRM. The "Pay In Advance" payment option may provide mailers with interest on pre-paid BRM.

All of the payment solutions of the present invention allow the mailer to view all of their account detail on-line, including historical payment information by permit number, initiate on-line payments, and initiate and approve on-line authorizations. Customers can make payments to the BRM payment aggregator in a number of ways, including, for example, via check, ACH credit or debit or wire.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
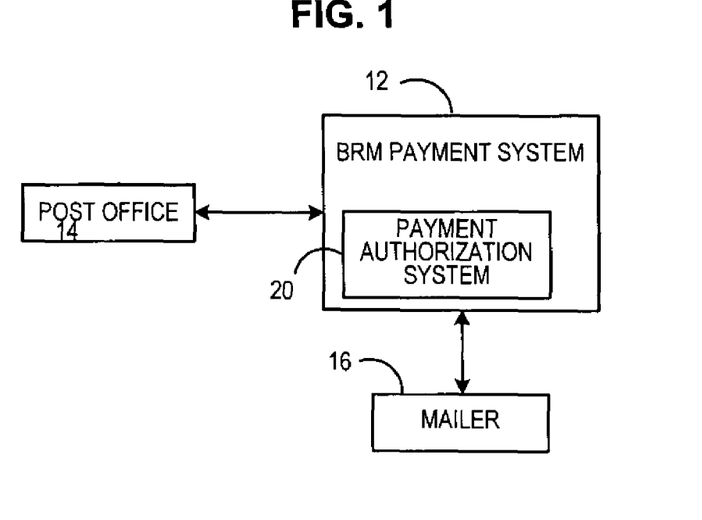
FIG. 1 illustrates in block diagram form a system for payment of business reply mail according to the present invention.

In describing the present invention, reference is made to the drawings, wherein there is seen in FIG. 1 a system for payment of business reply mail according to the present invention. A BRM payment system 12 maintains a payment account, such as CAPS, with the post office 14. BRM payment system 12 is authorized by the mailer 16 to provide payment to the post office 14 for returned BRM originally sent by the mailer 16. The BRM payment system 12 provides the mailer 16 with multiple payment options not currently available to pay for business reply mail. For example, the BRM payment system 12 can enable mailer 16 to participate in programs such as CAPS, regardless of whether mailer 16 meets the threshold criteria for CAPS by aggregating a plurality of mailers under a master account held by BRM payment system 12.

Figure 2:
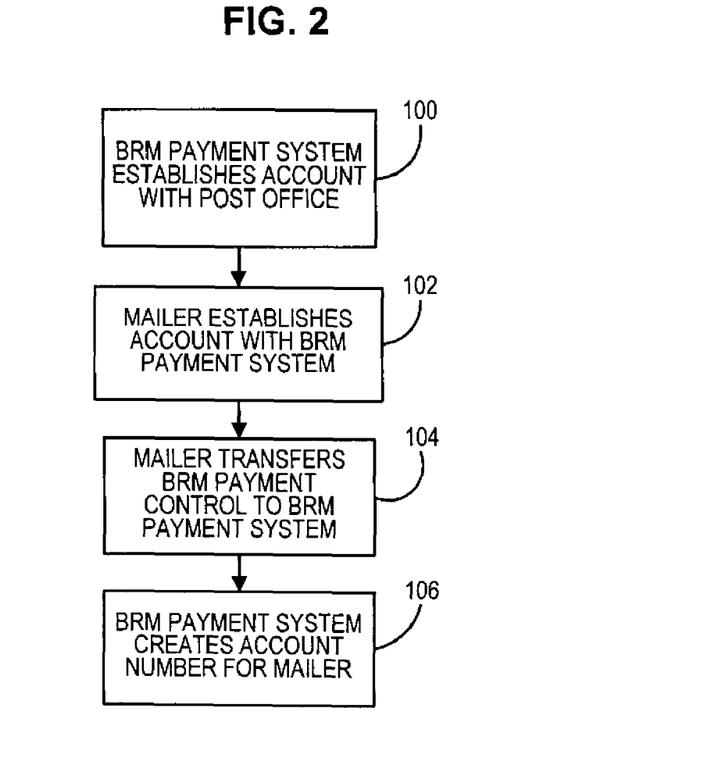
FIG. 2 illustrates in flow diagram form a process for payment of business reply mail according to the present invention.

The operation of BRM payment system 12 will be described with respect to the process flow diagrams illustrated in FIGS. 2, 3A and 3B. Referring now to FIG. 2, in step 100 the BRM payment system 12 establishes a payment account with the post office 14 to provide payment for BRM. The payment account could be, for example, a master CAPS account. It should be noted that while BRM payment system 12 may not actually be registered for any BRM permit imprints, BRM payment system 12 can qualify for a CAPS account based on an aggregation of BRM permit imprints for mailers, such as mailer 16, that will utilize the system 12.

Figure 4:
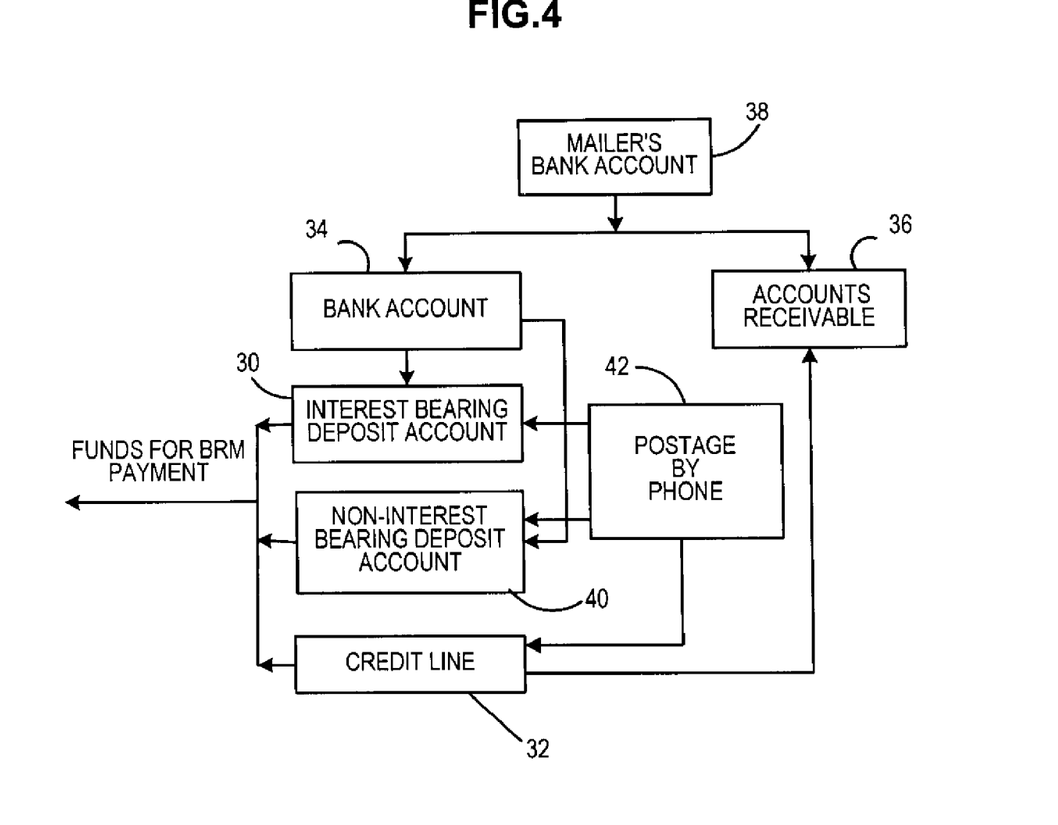
FIG. 4 illustrates in block diagram form an exemplary account for payment of business reply mail according to the present invention.

In step 102, a mailer 16 establishes an account with the BRM payment system 12 to provide services related to payment for returned BRM. This account for mailer 16 can be established in a number of different ways as illustrated in FIG. 4. BRM payment system 12 can establish an interest bearing deposit account 30 and/or a non-interest bearing deposit account 40 for mailer 16 from which funds may be used to pay the postage for BRM returned to mailer 16. Interest bearing deposit account 30 allows the mailer 16 to accumulate interest on any funds deposited in interest bearing deposit account 30. Funds for the interest bearing deposit account 30 or non-interest bearing deposit account 40 for mailer 16 can be provided by transferring funds, in any convenient manner, such as, for example, by wire transfer, check, ACH credit, etc., from the mailer's bank account 38 to a bank account 34 of BRM payment system 12. These funds are then transferred to the interest bearing deposit account 30 or non-interest bearing deposit account 40. Alternatively to, or in addition to, interest bearing deposit account 30 and/or non-interest bearing deposit account 40, BRM payment system 12 could also establish a credit line 32 for mailer 16 if desired. Payments for returned BRM made via the credit line 32 are billed to the mailer 16 by the accounts receivable department 36 of BRM payment system 12, which then receives payment from the mailer, typically from the mailer's bank account 38. Additionally, the interest bearing deposit account 30, non-interest bearing deposit account 40 and/or credit line 32 could be maintained by mailer 16 utilizing a dial-up system, such as, for example, Postage-by-Phone® 42 from Pitney Bowes. Thus, the present invention provides mailer 16 with multiple payment options for BRM including "Just-In-Time" payments, "Pay In Advance" payments, and/or "Pay In Arrears" payments. The "Just-In-Time" payment option allows the mailer 16 to pay the BRM payment system 12 at the completion of each transaction with the post office, i.e., when returned BRM is accepted for return to the mailer 16. The "Pay In Arrears" payment option provides the mailer 16 with a credit line 32 to pay for returned BRM. The "Pay In Advance" payment option may provide mailer 16 with interest on pre-paid BRM. All of the payment solutions of the present invention allow the mailer 16 to view all of their account detail on-line via a remote computer coupled to a network, such as, for example, the Internet. Account details include, for example, historical payment information by BRM permit number, initiate on-line payments, and initiate and approve on-line authorizations.

Referring again to FIG. 2, in step 104 the mailer 16 transfers responsibility for payment of returned BRM under its BRM permit, issued by the post office 14, to BRM payment system 12. Thus, BRM payment system 12 will be authorized to pay the post office 14 for returned BRM under the permit number assigned to mailer 16 utilizing the account established by BRM payment system 12 in step 100. As noted above, BRM payment system 12 provides mailer 16 with additional payment options and ways to better utilize their funds, while also decreasing the amount of record keeping, processing and costs for the post office 14 as will be further described below.

In step 106, the BRM payment system 12 establishes a customer account number for mailer 16. This may be established by combining the BRM permit number for mailer 16 and the zip code of the return address of the mailer 16. The zip code of the return address indicates the post office 14 where any return BRM will be delivered for acceptance and final return to the mailer 16. Since permit numbers will not repeat for the same post office 14, by combining the BRM permit imprint number and the zip code of the post office 14 for mailer 16, an account number will be generated that uniquely identifies mailer 16 and the corresponding BRM permit imprint number. Thus, even if mailer 16 has multiple BRM permit imprint numbers or utilizes multiple return addresses, a unique account number will be generated for each BRM permit number. Of course, if mailer 16 has multiple BRM permit imprint numbers or utilizes more than one return address, BRM payment system 12 could establish a single master account for mailer 16 which maps to each of the accounts for the individual BRM permit imprint numbers. The account number for mailer 16 is utilized to track postage payments for returned BRM as described below.

Figure 3A:
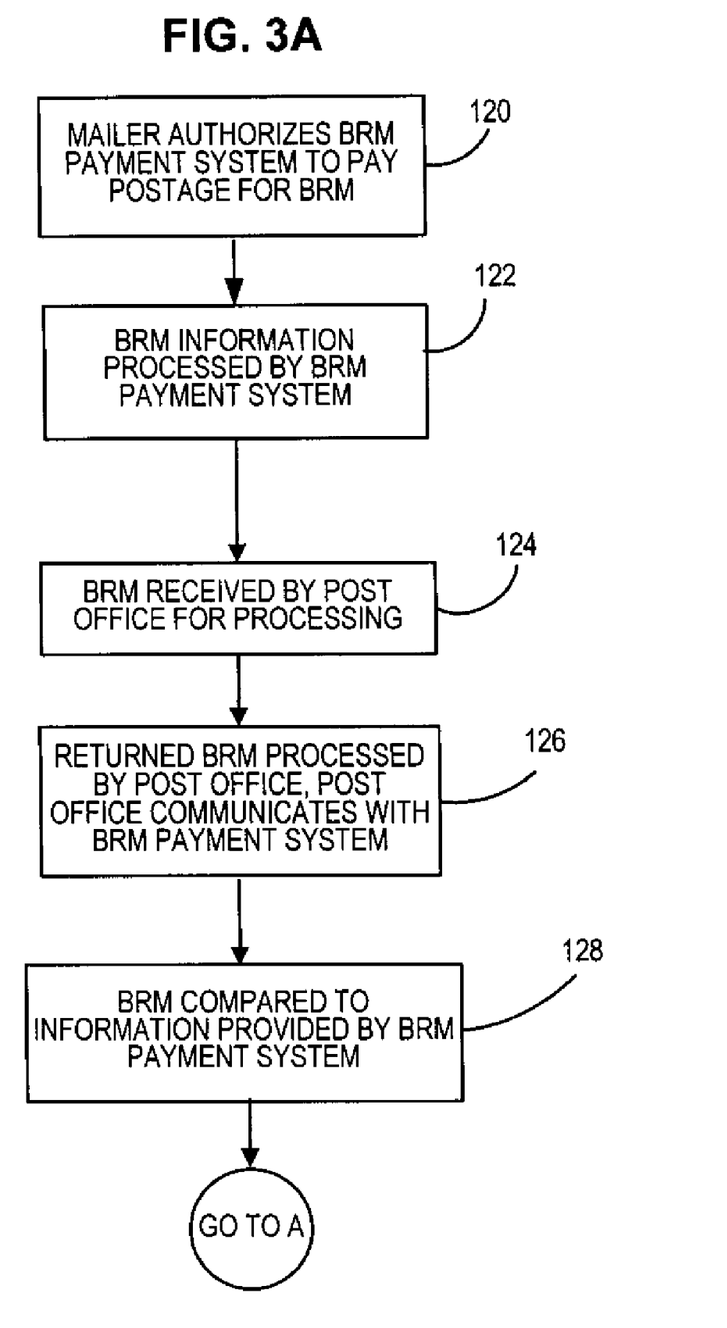
FIGS. 3A and 3B illustrate in flow diagram form further processing for the payment of business reply mail according to the present invention.
Figure 3B:
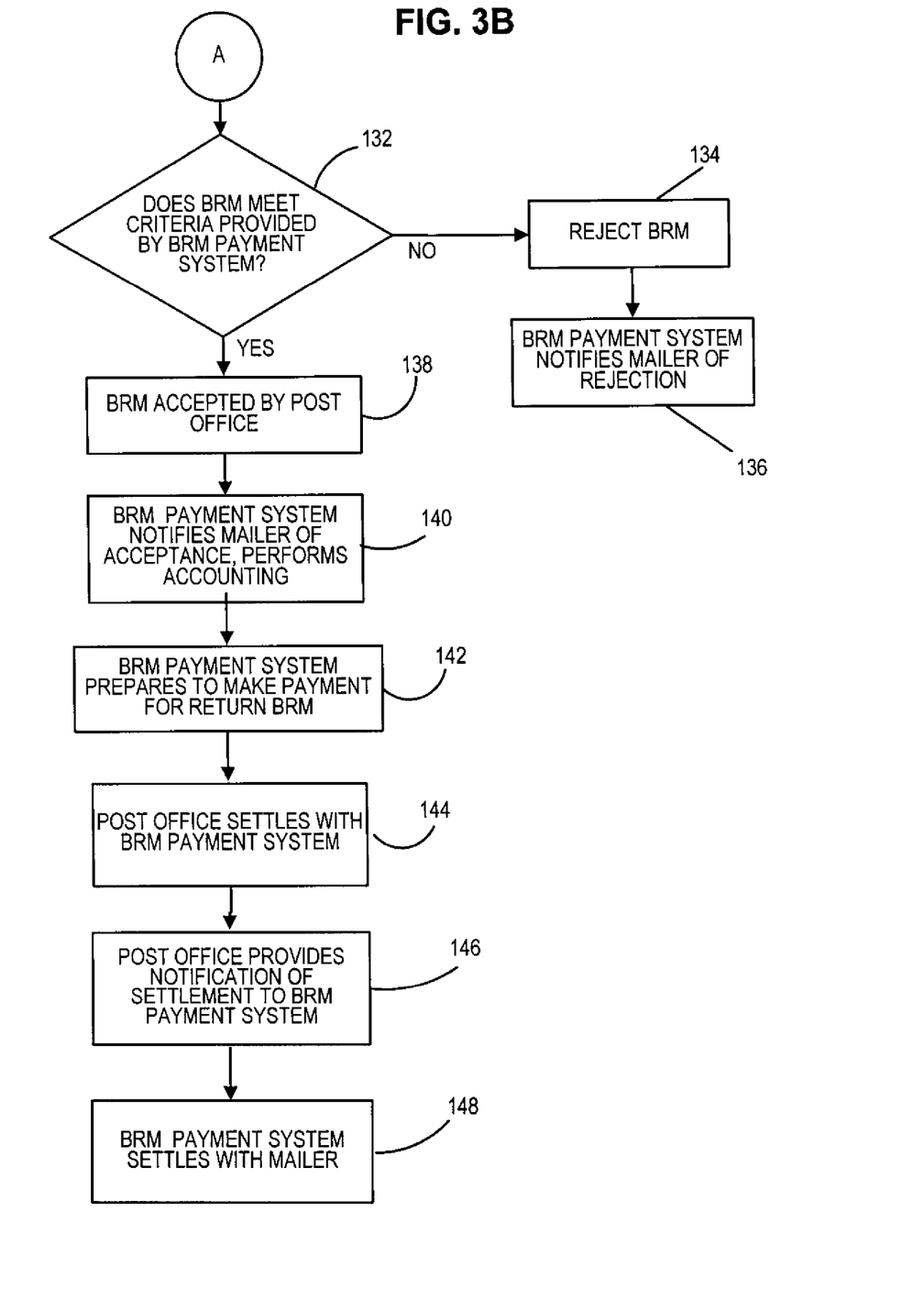

Referring now to FIGS. 3A and 3B, there is illustrated in flow diagram form the processing performed for payment of BRM according to the present invention. Suppose, for example, mailer 16 decides to send a mailing that includes BRM for return to the mailer 16. In step 120, the mailer 16 authorizes the BRM payment system 10 to make payments for postage for the returned BRM. This authorization can be made directly by the mailer 16 or an authorized agent of the mailer 16. Such authorization could be provided, for example, by telephone, via a web page operated by BRM payment system 12 and accessed by mailer 16, facsimile, e-mail, etc. With respect to authorization by telephone, it should be noted that mailer 16 could provide authorization utilizing a voice recognition unit (VRU). Regardless of the means for providing the authorization, the authorization includes information related to the BRM. For example, the information could be provided by the mailer 16 completing a statement of business reply mail form. Such information could include, for example, the permit imprint number for the BRM, the zip code number associated with the permit number, i.e., the zip code of the addressee to which the BRM will be returned, the return address that should appear on every piece of BRM (including the permit holder's name), a maximum number of pieces expected under the current authorization (which when exceeded causes the current authorization to automatically expire), a maximum postage amount under the current authorization (which when exceed causes the current authorization to automatically expire), a daily limit amount for the number of pieces or postage amount, threshold amounts for either the total number of pieces received or total amount of postage paid upon which the mailer will be notified, and a fixed date upon which the current authorization should automatically expire. Optionally, if no expiration date is provided, the BRM payment system could automatically set a fixed expiration period, such as, for example, six months or one year.

In step 122, the information related to the BRM is processed by BRM payment system 12. According to one embodiment of the invention, processing includes the generation of a Payment Authorization Number (PAN) by a payment authorization system 20 (FIG. 1). The PAN is linked to the information related to the BRM and provided to the mailer 16. The PAN can be used by the mailer 16 to maintain account records with respect to one or more BRM mailings currently in process. Optionally, the PAN could also be provided to the post office 14 at which the return BRM will be processed for use as described below. Alternatively, a PAN need not be generated, and instead processing the information related to the BRM can include storing the information in such a way that it can be easily retrieved based on information related to the BRM. The information could be stored, for example, in a database (not shown) accessible by the BRM payment system 12. Retrieval could be performed, for example, by searching the database based on one or more of the permit imprint number, permit holder's name, and zip code associated with the permit number.

In step 124, the returned BRM is received by the post office 14 for processing and eventual return to the mailer 16. In step 126, the returned BRM is processed by the post office 14. Such processing could either be performed manually, such as, for example, by a postal clerk, or automatically utilizing processor based equipment equipped with scanners, such as, for example, sortation equipment, facers, and the like. Such processing includes, for example, calculating the amount of postage due based on the number of pieces of BRM being processed. Typically, the processing includes the completion of USPS Form 3582-C Postage Due Invoice, which details the number of pieces and calculated postage due. This can either be completed manually by a postal clerk or automatically by a processor based system. The post office 14 then communicates with the BRM payment system 12, and provides the amount of postage due to confirm payment for the BRM. If a PAN was issued and provided to the post office 14, the PAN can be matched to the mailer 16, for example, utilizing the permit number and mailer's name, and the PAN provided to the BRM payment system 12 for verification. If no PAN was issued or the PAN was not provided to the post office 14, then the post office 14 can communicate with the BRM payment system 12 to determine if, based on the permit number and permit holder's name, i.e., the mailer 16, or permit holder's zip code, payment for the BRM will be made by the BRM payment system 12. Such communication can be performed, for example, via telephone or a network, such as, for example, the Internet.

In either case, the BRM payment system 12 will preferably again determine that sufficient funds are available within the account or credit limit of mailer 16 to pay for the postage due for the returned BRM. If sufficient funds are available, BRM payment system 12 can then verify that the PAN (if provided by the post office 14) is active, and provide the post office 14 with the information related to the BRM that is linked to the PAN, or if no PAN is provided, linked to the permit number and permit holder's name. Such information could include, for example, the permit imprint number for the BRM, the zip code number associated with the permit number, i.e., the zip code of the addressee to which the BRM will be returned, the return address that should appear on every piece of BRM (including the permit holder's name), a maximum number of pieces expected under the current authorization (which when exceeded causes the current authorization to automatically expire), a maximum postage amount under the current authorization (which when exceed causes the current authorization to automatically expire), a daily limit amount for the number of pieces or postage amount, and a fixed date upon which the current authorization will automatically expire. If sufficient funds are not available, the BRM payment system 12 can instruct the post office 14 to reject the returned BRM.

In step 128, if the post office 14 has not been instructed by the BRM payment system 12 to reject all of the returned BRM, the returned BRM is compared to the information provided by the BRM payment system in step 126. In step 132 it is determined if the returned BRM meets each of the criteria provided by the BRM payment system 12. If in step 132 it is determined that the returned BRM does not meet each of the criteria provided by the BRM payment system 12, or if the post office 14 was instructed by the BRM payment system 12 to reject the returned BRM, such as, for example, in the case of insufficient funds, then in step 134 all or a portion of the returned BRM is rejected by the post office 14 and will not be returned to the mailer 16. The post office 14 will provide notice of the rejection to the BRM payment system 12. Such notice could include, for example, the number of pieces being rejected and the reason, along with other details from the USPS Form 3582-C. For example, if the daily limit amount for the number of pieces has been exceeded, the post office 14 can accept only the daily limit amount and reject the remainder. Such rejection could include either discarding the remainder of the BRM, or holding that portion of the BRM until the next day for reprocessing. Similarly, if the daily limit for the amount of postage has been exceeded, the post office can accept only a portion of the returned BRM that meets the postage amount limit, and reject the remainder. Such rejection could include either discarding the remainder of the BRM, or holding that portion of the BRM until the next day for reprocessing. If the maximum piece number or postage amount has been exceeded, then any remainder BRM will preferably be discarded.

If any or all of the returned BRM is rejected in step 134, because of instructions from the BRM payment system 12 or it does not meet one or more of the criteria as provided by the BRM payment system 12, then preferably in step 136 the mailer 16 is notified of the rejection by the BRM payment system 12. Such notification can be performed, for example, by an automated telephone system, facsimile, e-mail, etc. Preferably, the notification includes details of the rejected BRM, including the number of pieces being rejected and the reason, as well as any other information from the USPS Form 3582-C. Additionally, the BRM payment system 12 will also preferably provide the mailer 16 with additional information related to the authorization, such as, for example, threshold limits set by the mailer 16, expiration date, etc., such that the mailer 16 can determine if renewal of the authorization is desired, such as, for example, to reset threshold limits or the expiration date. For example, the mailer 16 may desire to reset the daily limit amounts or the expiration date.

If in step 132 it is determined that the returned BRM meets the criteria as provided by the BRM payment system 12, then in step 138 the returned BRM is accepted by the post office 14 and the post office 14 provides notice of the acceptance to the BRM payment system 12. Such notification preferably includes the actual piece count and the actual cost of the returned BRM, along with other details from the USPS Form 3582-C.

In step 140 the BRM payment system 12 provides notification to the mailer 16 of the accepted BRM by the post office 14, and can provide the actual piece count, actual cost, and other information collected by BRM payment system 12 as provided by the post office 14. Such notification could be done, for example, by an automated telephone system, facsimile, e-mail, etc. Additionally, the BRM payment system 12 will also preferably provide the mailer 16 with additional information related to the authorization, such as, for example, threshold limits set by the mailer 16, expiration date, etc., such that the mailer 16 can determine if renewal of the authorization is desired. For example, the mailer 16 may desire to reset the daily limit amounts or the expiration date. In addition, in step 140 the BRM payment system 12 performs accounting procedures to update the information associated with the BRM to include the BRM just accepted by the post office 14. For example, the BRM payment system 12 can update the total number of pieces returned and the total amount of postage paid to include the just returned BRM.

In step 142, the BRM payment system 12 prepares for payment of the returned BRM from the account for mailer 16. It is important to note, however, that at the time the mailer 16 provided authorization for the BRM (step 120 of FIG. 3A), it was not necessary to move money from the mailer's account with the BRM payment system 12. Thus, the mailer 16 has not occurred any type of finance charges or fees if the payment is being done utilizing the credit line 32, nor has the mailer 16 lost any interest from money being removed from the interest bearing deposit account 30. Preferably, it is not until after the notification of acceptance by the post office 14 is received in step 138 that the funds needed to pay for the returned BRM are removed or charged against the account of mailer 16 in BRM payment system 12, as selected by the mailer 16, and placed in the master account that BRM payment system 12 holds with the post office 14.

Alternatively, the master account that BRM payment system 12 holds with the post office 14 could always maintain a minimum balance based on statistical normal daily transactional costs. This system, however, is not as efficient as transferring the funds into the master account just before payment is to occur, as any potential interest may be lost on the funds that remain idle in the master account.

In step 144, the post office 14 settles with the BRM payment system 12, such as, for example, by executing an ACH debit against the master account that the BRM payment system 12 maintains with the post office 14 for the BRM of the mailer 16. Typically, this is performed at the end of each day or on the next business day after acceptance of the BRM, and can aggregate all of the payments due for all BRM accepted by the post office 14 for all mailers that have accounts with the BRM payment system 12. Accordingly, the funds removed or charged against the account of mailer 16 in BRM payment system 12 in step 142 will be available in the master account that BRM payment system 12 maintains with the post office 14. Alternatively, the BRM payment system 12 may provide funds to the post office 14 by way of a wire funds transfer or by way of an ACH credit transaction which would move funds from BRM payment system's bank account 34 to the bank account of post office 14.

In step 146, the post office 14 can optionally provide notification, typically via a web site accessible by BRM payment system 12, of confirmation of the above transaction, i.e., that return BRM was paid for utilizing the master account of BRM payment system 12. The confirmation may include additional information such as, for example, the acceptance site, the permit number, the cost of the return BRM and the actual number of pieces. This information can be utilized by BRM payment system 12 to track postage payments against the record of all authorizations for payment for BRM that were made by mailer 16 for auditing purposes.

In step 148, the BRM payment system 12 can, if necessary, settle with the mailer 16. Such settlement can include, for example, providing an invoice for the postage due, or a statement of charges made against the account of the mailer 16. The particular type of settlement depends upon the type of account the mailer 16 has with the BRM payment system 12. For example, the BRM payment system 12 could invoice the mailer for all returned BRM accepted within a given time period, such as, for example one or two weeks. If the mailer 16 has funds on account with the BRM payment system 12, the BRM payment system 12 could deduct the funds from the mailer's account on a predetermined regular basis, such as, for example, daily, weekly, etc. Alternatively, the funds could be deducted as soon as each transaction is completed. The present invention provides mailers with multiple payment options for business reply mail including "Just-In-Time" payments, "Pay In Advance" payments, and/or "Pay In Arrears" payments. The "Just-In-Time" payment option allows the mailer 16 to pay the BRM payment system 12 when the returned BRM is accepted by the post office 14. The "Pay In Arrears" payment option provides the mailer 16 with a credit line to pay for BRM. The "Pay In Advance" payment option may provide mailers with interest on pre-paid BRM.

In accordance with another embodiment of the present invention, BRM payment system 12 does not need any type of PAN system 20 or keep any records of BRM authorized by the mailer 16. In this embodiment, the mailer 16 need not provide any type of advance authorization to pay for the BRM. When BRM is accepted by the post office 14 under a permit imprint for which BRM payment system 12 has payment responsibility, the master account held by BRM payment system 12 will be charged for the BRM, regardless of the cost. The BRM payment system 12 will then bill the costs for the return BRM back to the mailer 16. This embodiment, however, is less secure as BRM payment system 12 will be liable for payment for any return BRM, as long as the permit number and zip code of the addressee are correct.

Thus, the BRM payment system 12 of the present invention provides mailers of all sizes with several payment options to securely pay for business reply mail, reduces the amount of record keeping for both mailers and the postal authority, provides mailers with additional resources to manage their funds more effectively, and reduces USPS operating costs, including, for example, check processing costs. For example, mailer 16 can utilize the CAPS system of the USPS without having to individually meet the threshold criteria for CAPS. Additionally, according to the present invention, the mailer 16 can now utilize either an interest bearing deposit account 30 or establish a credit line 32, neither of which the post office 14 currently provides. Furthermore, the system 12 according to the present invention will reduce the record keeping required by the post office 14, as now multiple mailers are aggregated under a single master account for BRM payment system 12. Thus, BRM payment system 12 must perform the bulk of the record keeping, significantly reducing the workload on the post office 14. Along with this, since the number of mailers that will pay by cash or check for business reply mail will significantly decrease, so will the time and expense incurred by the post office 14 for processing those types of payments.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A method for paying for business reply mail being returned by a recipient of the business reply mail to a mailer of the business reply mail, the method comprising:
   establishing, by a reply mail payment system, a master payment account with a postal service, the master payment account adapted to make payment for business reply mail under a plurality of different business reply mail permit numbers that are not assigned to the reply mail payment system, the plurality of different business reply mail permit numbers including a business reply mail permit number assigned to the mailer;
   receiving, by the reply mail payment system, authorization from the mailer to pay for business reply mail being returned by the recipient to the mailer, the business reply mail being associated with the business reply mail permit number assigned to the mailer, the authorization including information related to the business reply mail;
   receiving, by the reply mail payment system, a communication from a post office to which the business reply mail is returned for processing to return to the mailer;
   providing, by the reply mail payment system, the information related to the business reply mail to the post office for comparison with the business reply mail returned to the post office; and
   providing, by the reply mail payment system, payment to the post office for the business reply mail returned by the recipient and accepted by the post office for return to the mailer from the master payment account.

2. The method according to claim 1, wherein each of the plurality of different business reply mail permit numbers has at least one associated payment account, the method further comprising:
   providing, by the reply mail payment system, funds to pay for the accepted business reply mail from a payment account associated with the mailer.

3. The method according to claim 2, wherein providing, by the reply mail payment system, the information related to the business reply mail to the post office further comprises:
   determining, by the reply mail payment system, if sufficient funds are available in the at least one associated payment account to pay for the business reply mail returned to the post office;
   if sufficient funds are available, providing the information related to the business reply mail to the post office; and
   if sufficient funds are not available, providing instructions to the post office to reject at least a portion of the business reply mail returned to the post office.

4. The method according to claim 2, wherein the payment account associated with the mailer includes an interest bearing deposit account.

5. The method according to claim 2, wherein the payment account associated with the mailer includes a non-interest bearing deposit account.

6. The method according to claim 2, wherein the payment account associated with the mailer includes a credit account.

7. The method according to claim 1, wherein the master payment account is a Centralized Account Processing System account.

8. The method according to claim 1, wherein the information related to the business reply mail includes at least one of a permit number assigned to the mailer for the business reply mail, a zip code number associated with the permit number, a return address that should appear on every piece of business reply mail being returned to the mailer, a maximum number of pieces expected, a maximum postage amount, a daily limit number of pieces, a daily limit postage amount, and a date upon which the authorization to pay will expire.

9. The method according to claim 1, wherein receiving, by the reply mail payment system, authorization to pay for business reply mail further comprises:
   processing, by the rely mail payment system, the information related to the business reply mail.

10. The method according to claim 9, wherein processing, by the reply mail payment system, the information further comprises:
    generating, by the reply mail payment system, a payment authorization number associated with the business reply mail, the payment authorization number being linked with the information related to the business reply mail.

11. The method according to claim 10, wherein the communication from a post office to which the business reply mail is returned for processing includes the payment authorization number, and the method further comprises:
    determining, by the reply mail payment system, if the payment authorization number is valid; and
    providing, by the reply mail payment system, the information related to the business reply mail that is linked to the payment authorization number to the post office if the payment authorization number is valid.

12. The method according to claim 1, further comprising:
    receiving, by the reply mail payment system, notice from the post office of acceptance or rejection of the business reply mail; and
    providing, by the reply mail payment system, notification of the acceptance or rejection of the business reply mail to a third party.

13. The method according to claim 12, wherein the notification of acceptance or rejection includes an actual piece count of the accepted business reply mail and an actual cost for the accepted business reply mail as determined by the post office.

14. The method according to claim 12, wherein the third party is a mailer that authorized payment for the business reply mail.

15. A method for payment for business reply mail comprising:

aggregating, by a reply mail payment system, a plurality of business reply mail permit accounts into a master account, each of the plurality of business reply mail permit accounts having at least one associated payment account;

receiving, by the reply mail payment system, a notification of acceptance of returned business reply mail from a mail carrier, the business reply mail being accepted under one of the plurality of business reply mail permit accounts;

providing, by the reply mail payment system, payment for the returned business reply mail from the master account; and removing, by the reply mail payment system, funds for the returned business reply mail from a payment account associated with the one of the plurality of business reply mail permit accounts.

16. The method according to claim 15, wherein the at least one associated payment account includes an interest bearing deposit account.

17. The method according to claim 15, wherein the at least one associated payment account includes a non-interest bearing deposit account.

18. The method according to claim 15, wherein the at least one associated payment account includes a credit account.

19. The method according to claim 15, wherein the master account is a Centralized Account Processing System account.

* * * * *